United States Patent

[11] 3,543,811

| [72] | Inventors | Charles E. Lamka<br>1218 Crocket St., 79106;<br>Walter J. Atkins, 2414 S. Ong, Amarillo,<br>Texas 79109 |
|---|---|---|
| [21] | Appl. No. | 751,241 |
| [22] | Filed | Aug. 8, 1968 |
| [45] | Patented | Dec. 1, 1970 |

[54] PROCESS FOR DISPENSING ICY MATERIALS
5 Claims, 12 Drawing Figs.

[52] U.S. Cl. .................................................. 141/9;
62/344; 222/1
[51] Int. Cl. .................................................. F25c 5/16
[50] Field of Search........................................ 62/344;
222/56, 146(C), 302, 1; 141/1, 9

[56] References Cited
UNITED STATES PATENTS
1,778,216 10/1930 Hansen......................... 222/302X

| 2,426,368 | 8/1947 | Mayne et al. .................. | 62/344X |
| 3,045,445 | 7/1962 | MacLeod ..................... | 62/344X |
| 3,067,591 | 12/1962 | Lingle .......................... | 62/344 |
| 3,101,872 | 8/1963 | Dickinson ....................222/146(C)UX |
| 3,403,819 | 10/1968 | Skelton ........................ | 222/56 |

Primary Examiner—Laverne D. Geiger
Assistant Examiner—Edward J. Earls
Attorney—Ely Silverman ABSTRACT: Apparatus and process for accurate continuous automatic volumetric dispensing and bagging of large amounts of ice arcs and cubes and like icy particulate material normally tending to form larger clumps of varying size and stiffness. Repeated small volumes of such to be bagged icy material are intermittently automatically continually and approximately measured out and brought to and briefly maintained in a fluid condition immediately prior to continuous dispensing thereof to smaller final volumetric measuring dispensing and bagging apparatus.

FIG. 1

WALTER J. ATKINS
AND CHARLES E. LAMKA
INVENTORS

BY

*Ely Silverman*

ATTORNEY

INVENTORS
W. J. ATKINS
AND C. E. LAMKA

BY Ely Silverman
ATTORNEY

W. J. ATKINS
AND C. E. LAMKA
INVENTORS

BY

*Ely Silverman*
ATTORNEY

W.J. ATKINS
AND C.E. LAMKA
INVENTORS

BY Ely Silverman

ATTORNEY

PROCESS FOR DISPENSING ICY MATERIALS

BACKGROUND OF THE INVENTION

The fields of art to which this invention pertains are:
1. fluent material handling having means for continually feeding out contents material during filling and wherein the means for moving the content supply is controlled; and
2. article dispensing in which articles present in the flow path between dispensing source and egress outlet cooperate with, rather than block, replenishment sources.

Description of the Prior Art

Cubed ice and the like, such as arc ice, and fragmented ice, have been expensive to package because of the tendency to "pack" into large dense masses and because of the tendency to form bridges over the orifices of containers in which it has been desired to dispense or package or contain such icy material.

Current laws as well as development of customer preference in self-service stores requires the statement of weight on packages of such material to be reliable and accurate. This has necessitated the common practice of hand labor to spoon out and weight into and strike excess from packages of such icy material. While automatic dispensers such as U.S. Pat. Nos. 3,156,273, 2,540,529 and 2,616,591 are available they are not amenable to packaging of arc ice and cube ice because, inter alia, large packed masses of the individual ice cubes and arcs and the like develop mechanical blocks in such machines. This invention solves the problem of accurately and reliably and continuously and automatically dispensing icy particulate material such as ice cubes, ice arcs and the like that rapidly "set up" or pack into large masses.

SUMMARY OF THE INVENTION

On signal from a photoelectric beam in a first container formed with vertical walls and containing a mass of icy solid material that tends to pack, a replenishment mass of like icy material in an auger casing with an auger discharge, discharges increments of like icy solid material into said first container to agitate and admix with the mass of like icy material in the first container and maintain and/or render it fluent. A continuously operative volumetric measuring and dispensing means continually receives portions of the icy material while it is fluent from the first container and discharges each of those portions into each of a series of receptacles therefor.

BRIEF DESCRIPTION OF THE DRAWINGS

FIG. 8 shows the first relative location of the openings 81, 82 and 83. FIG. 9 shows a stage in the operation of the apparatus 20 immediately following that shown in FIG. 8; FIG. 10 shows the location of the holes 81, 82 and 83 relative to walls of the hopper 100 and to the opening 126 in the stage of operation of apparatus 20 following the stage shown in FIG. 10; FIG. 11 shows the relations of the holes 81, 82 and 83 and the hopper structure 100 in a stage immediately following that shown in FIG. 10.

The location of chute 166 and 171 relative to edge 103 of hopper 100 is an accurate functional representation and illustrates the relative location of the impact area 229 and the initial zone of loading of units as 61, 62 and 63 from hopper 100.

Table I sets out measurements for an embodiment of apparatus and process according to this invention.

FIGS. 8, 9, 10 and 11 are drawn to scale in regard to parts of assembly 24 and parts of assembly 25, namely, holes 81, 82 and 83, location of holes 121 and 124, center of shaft 66 and outline of hopper 100.

DESCRIPTION OF THE PREFERRED EMBODIMENT

Figure 1:
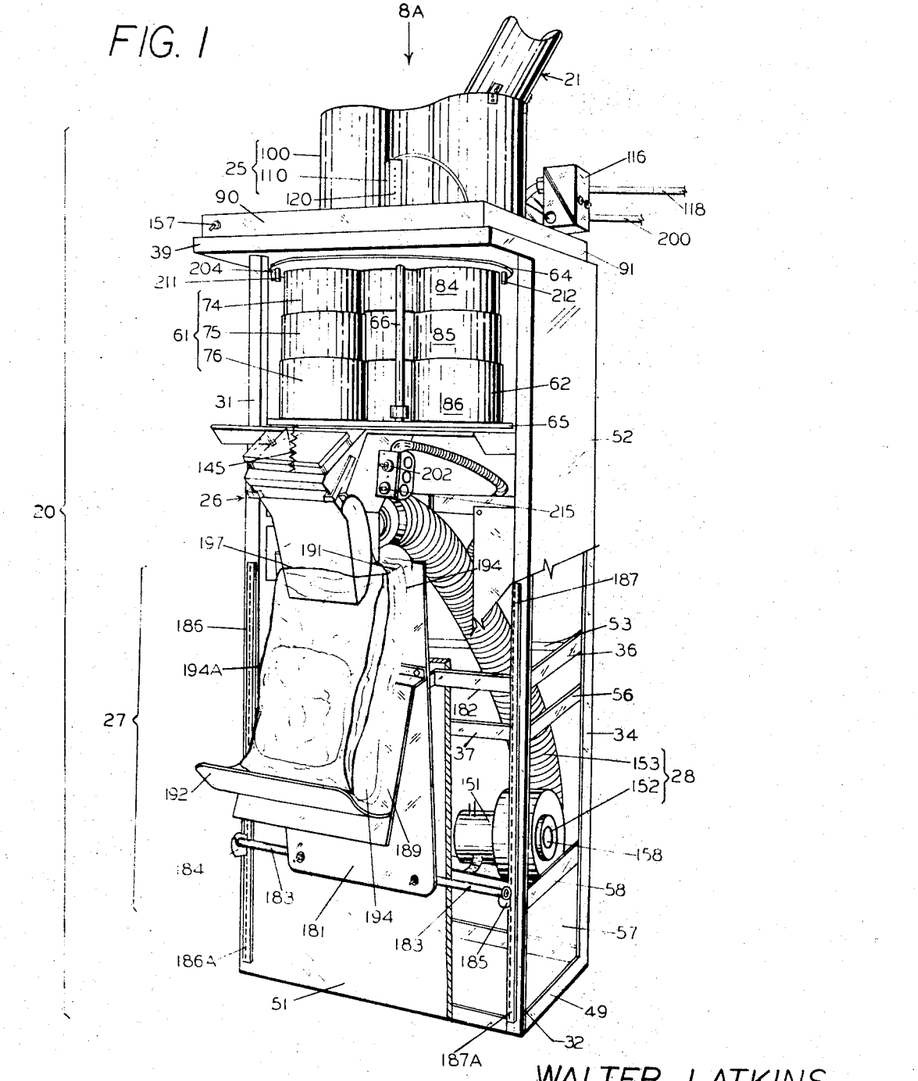
FIG. 1 is a perspective view of the apparatus 20 of this invention seen from its front and right side and shown with cover panels thereof partly broken away and exclusive of the auger assembly therefor.

The apparatus 20, shown in FIG. 1, comprises (a) a frame assembly 23, which is generally a rigid upright hollow structure; (b) a rotating sleeve assembly 24 which is located within the frame assembly 23 and rotatably supported thereon; (c) a hopper assembly, 25, located on top of and secured to the frame assembly 23; (d) a spout assembly 26 which is firmly secured to the frame assembly 23 in operative relationship to the bottom of the rotating sleeve assembly 24; (e) a bag holding assembly 27 which is removably yet firmly locatable and located on the front portion of the frame assembly 23 below and in operative relationship to the spout assembly 26; (f) a bag-opening assembly 28 which is operatively connected to the spout assembly 26 and firmly supported on and located in the frame assembly 23; (g) a feed auger assembly 21, and (h) a control assembly 22 which is operatively connected to the motors for the rotating sleeve assembly and for the bag-opening assembly and connected to the motor for the auger assembly.

The apparatus 20 cooperates with a package sealing assembly 29 in its operation.

The principal material treated by the apparatus 20 is a fungible mass 41 of like uniformly moist icy sized particles of ice arcs (180° of a ring of 1¾-inch external diameter, ¾-inch internal diameter, ¾ inch high) formed of ice, hereinbelow referred to as arcs. However the apparatus 20 also treats masses of like uniformly sized ice cubes (1¼ inch high, 1¼ inch deep, 1¼ inch width) or crushed and sized fragmented ice of about ½ inch by ½ inch by ½ inch size. Such icy units of arcs, cubes and fragmented ice readily pack to form large cohesive masses, very much larger in size (e.g., 5 to 20 times the diameter of the units) than the size of the individual units of cubes, arcs or fragments with variable but small pressure (¼ to 2 p.s.i.) in short times (5 to 15 seconds). The units (as cubes, arcs, etc.) have enough coherence in such packed cohesive masses that such masses do not freely flow from hoppers. Other icy semifluent materials such as frozen foods of comparable size and surface characteristics as frozen diced potatoes (approximately ½ inch by ½ inch by ½-inch size), frozen peas (approximately ½-inch diameter), frozen sliced carrots (approximately ¼ inch thick and ¾-inch diameter), that also readily pack (i.e., adhere to each other) to form larger nonfluent masses on application thereto of similarly light pressures for short times may be readily packaged by the process and apparatus of this invention. This "setting-up" or "packing" characteristic results in that a mass of ice cubes and the like do not stay as a fluent mass for any period of time. Attempts to dispense such materials on a volumetric basis for commercial purposes are not, except for the invention herein described, available.

Figure 2:
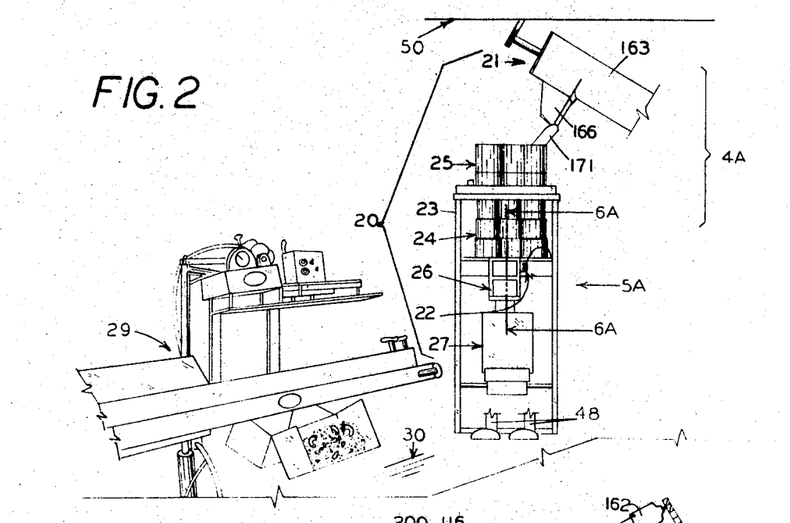
FIG. 2 is a front view of the overall assembly in which the apparatus 20 operates.

The assemblies 20—28 are synergistically and cooperatively connected to each other and the entire apparatus 20 is supported on the floor 30 of an icehouse operatively adjacent to the package sealing assembly 29 generally as shown in FIG. 2. In general, referring to FIG. 2, ice arcs, 41, are passed from the discharge of the auger assembly 21 (which is located adjacent to ceiling 50 of the icehouse in which the apparatus 20 is located) to the hopper assembly 25, thence to the rotating sleeve assembly 24, thence to the spout assembly into a bag as 47 held in the bag-holding assembly 27. The bags filled with the arcs are then passed to the package sealing assembly 29. The filled bags are moved by the operator 48 from bag-holding subassembly 27 to the package sealing assembly 29. An operator 48 of the apparatus 20 operates through the control assembly 22 to effectuate control of the apparatus 20 as below described in detail.

Figures 6, 7:
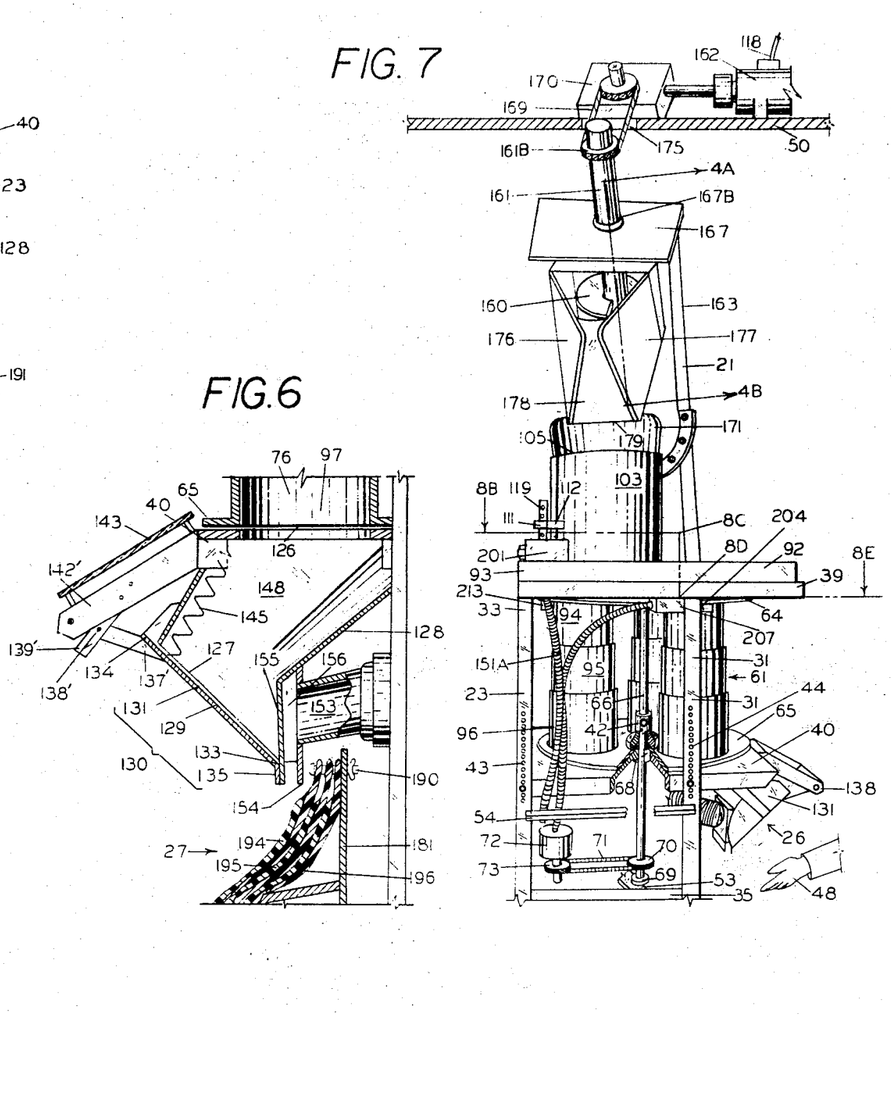
FIG. 6 shows spout assembly 26 in a vertical section taken along the flat vertical longitudinal plane 6A–6A shown in FIG. 2 with bag opening assembly 28 inoperative.
FIG. 7 is a side view of the upper portions of apparatus 20 with the panel usually below member 54 broken away and showing the portions of apparatus 20 as seen along the direction of the arrow 7B of FIG. 4.

The frame assembly 23 comprises a rigid front left vertical member 31, front right vertical member 32, rear left vertical member 33, and rear right vertical member 34. These rigid members are steel ells and firmly joined together to form a rigid hollow frame of rectangular outline. For this purpose rigid intermediate horizontal left transverse members as 35 and 54 on the left are joined to the left side members 31 and 33 and like rigid horizontal members as 36 and 56 on the right are firmly joined to right front and rear members 32 and 34; additionally a top open rigid box frame 39 joins the members 31, 32, 33 and 34 at their top; a similarly open rigid bottom rectangular box frame 49 is formed of rigid horizontal members between and joining members 31, 32, 33 and 34 at their bottom. Additionally, a horizontal member 53 is joined firmly to member 35 (between the attachment of the element 35 to elements 31 and 33) and to element 36 (between elements 32 and 34), generally as shown in FIG. 7, to provide support for a lower bearing 69 for a drive shaft 66 and locate that shaft so that a sprocket gear 70 located on that shaft will be behind the front panel 51 on the frame 23. Rigid panel 51 is located between and attached to the front elements 31 and 32 and similarly a right panel 52 is firmly attached to elements 32 and 34. These panels provide a closure as well as improve the rigidity of the frame. The attachment of such panels along the length of all vertical members (as panel 52 being attached to the members 32 and 34) helps to create a rigid frame on all sides. Similar panel (not numbered or shown) is located between elements 31 and 33; a similar rear panel 57 is located between elements 33 and 34.

The box 39 has a rigid right edge member 91, a rigid left edge member 92, a rigid rear edge member 93, a rigid front edge member 90 and a rigid top plate 89 joined firmly to the members 90—93.

A kidney-shaped hole 88 is provided in the top plate 89 of the top box 39 and hopper 100 firmly fits therein, plate 89 also has an opening for a bearing 67 and supports that bearing in that opening.

The rotating sleeve assembly comprises (a) a plurality of like hollow sleeve units, 61, 62 and 63, (b) a horizontal circular flat bottom plate 65, (c) a drive shaft 66 connected to the top and bottom plates and (d) bearings 67 and 68. The sleeve units 61, 62 and 63 are radially symmetrically arranged about the vertical axis of the shaft 66. The top plate 64 and the bottom plate 65 are rigid and parallel to each other and circular in shape and the centers of such circular plates are coaxial with each other. The rigid vertical drive shaft 66 is firmly attached to the center of the top plate 64, rotatably supported in bearing 67, and passes through the center of the bottom plate 65.

A collar 42 is firmly fixed to plate 40 and is adjustably yet firmly attached to shaft 66 by a set screw in that collar.

A lower bearing 69 for shaft 66 is firmly attached to a crosspiece 53 of the frame assembly 23 and is accordingly firmly located between the left and the right sides of the frame assembly 23 although slightly forward of a point halfway between a rear element as 33 and a front vertical member as 31. The top of the drive shaft 66 is firmly located and rotatably supported in an upper bearing 67, above plate 65; upper bearing 67 is firmly attached to plate 89 and located relative to the frame assembly 39 by ribbing attached to the plate 89. An intermediate bearing 68 for shaft 66 is rotatably attached to and locates shaft 66 and is firmly attached to the plate 40. A sprocket gear 70 is firmly attached to the shaft 66 well below the plate 65 and close above the bearing 69. This sprocket gear 70 is driven by a chain 71 which in turn is driven by a rotating sleeve assembly motor 72 through a speed reduction drive gear 73.

Motor 72 is firmly supported on frame assembly 23 by a firm and sturdy attachment to members (not shown) of assembly 23.

The unit 61 is made of a nesting telescoping set of rigid stainless steel smooth walled right cylinders as 74, 75 and 76, having the largest diameter cylinder at the bottom and the smaller diameter cylinder at the top of the group or set.

The unit 62 is formed of a similar group of telescoping cylinders 84, 85 and 86 and unit 63 is formed of similar units 94, 95 and 96; all components of units 61, 62 and 63 are thereby identical in size and shape and surface texture. The cylinders 94, 95 and 96 nest in each other and on the interior surface are smooth and cylindrical and formed of stainless steel.

The top surface of the plate 65 has circular orifices 81, 82 and 83 corresponding exactly to the orifice atop cylinders 74, 84 and 94 respectively; these provide openings through the top surface 80 of plate 89 for passage of material to each of the units 61, 62 and 63; and corresponding holes through the bottom plate 65 i.e., 97, 98 and 99 at the bottom of each of units 76, 86 and 96 for the units 61, 62 and 63, respectively, each provide passage from the rotating sleeves through the bottom thereof and for the movement of material therethrough.

In operation the motor 72 drives the gear 73 which drives a chain 71 which drives the gear 70 which rotates the shaft 66 to rotate, as seen from above, in a counterclockwise direction at a slow but steady speed, as 5 r.p.m., for loading a 10-pound bag of ice by the embodiment of which the dimensions are given in Table I herebelow.

As below described this steady rotating motion of the shaft 66 drives the plates 64 and 65, which are firmly attached to shaft 66 and to the units 61, 62 and 63. While the bearing 68 is movable up and down on the shaft 66 it is firmly locked thereto as by a set screw so that, notwithstanding the telescoping of the units 61, 62 and 63 so that there is a different amount of spacing between plates 64 and 65, both the plates 64 and 65 are driven at the same time at the same speed by the shaft 66. Each of members 31, 32, 33 and 34 is provided with a vertical series of holes, as 43 in member 33 and 44 in member 31; plate 40 is supported on bolts passed through those holes. Vertical adjustment of plate 40 thereby vertically relocates plate 40 and varies the length of units 61, 62 and 63 and adjust the volume of units 61, 62 and 63 as desired.

The hopper assembly 25 comprises a hopper 100 and a photoelectric eye assembly 110 thereon. The hopper 100 is, generally, a rigid kidney-shaped structure, it has a vertical outer wall 101 which is the outer surface of a right circular cylinder, the axis of which cylinder is coaxial with the axis of shaft 66, a right end wall, 102, a left end wall, 103, and an inner wall 104. Wall 104 is a rigid wall of generally cylindrical shape and, more particularly, in the shape of a right circular cylinder the axis of which is also coaxial with the center of shaft 66. The hopper 100 has a straight upper edge 105 which defines an upper hopper opening 106. The hopper 100 also has a bottom edge 107 with an opening 108 therein which is the same size and shape as opening 88. The openings 88, 108 and 106 are of the same size and shape and the walls therebetween are vertical. The hopper 100 may also comprise a cutter 109 which is located at and supported by the left-hand wall 103 at the level of the bottom opening 108. The right-hand and left-hand walls, 102 and 103 are right circular cylindrical walls that smoothly and tangentially meet the wall 104 on the interior side of the hopper 100 and wall 101 on the outer side of that hopper so that walls 101, 102, 103 and 104 smoothly flow into each other to define the upper opening 106 at the upper edge 105 and lower edge 107 of hopper 100.

FIG. 8, 9, 10 and 11 are drawn to scale in regard to hopper 100 and holes 81, 82 and 83 to illustrate their relations. The radius of curvature for surface of end walls 102 and 103 is slightly larger than the radius for the openings 81, 82 and 83. The outer peripheral portions or surfaces of the holes 81, 82 and 83 are located to be tangential to and directly below, i.e., in a vertical line with, the wall 101 during the movement of holes 81, 82 and 83 past orifice 88 in the wall 89. Edge 105 is horizontal and parallel to plates 64, 65 and 40.

The photoelectric eye assembly 110 comprises a standard photoelectric light source 111 and a collimator therefor 112 operatively connected as by lead wires 111A to the power source 201, the photoelectric light and collimator are adjustably by but firmly supported on a bracket 119 which is firmly yet adjustably supported on the plate 89. The photoelectric sensor cell or receptor 114 is mounted with its collimator 115 facing the collimator 112. The receptor is operatively connected to a relay 116 through a conduit 117 therefor and relay 116 is operatively connected to the motor 162 of the auger assembly 21. The receptor 114 is firmly mounted on a bracket 120 which is firmly attached to assembly 23 yet adjustable as to height. The collimator 112 is adjacent to and directed at a hole 121 in the outer wall 101 of the hopper 100 and the collimator 115 for the receptor 114 is located adjacent an opening 124 in the wall 104 whereby a beam of light 123 passes therebetween when apparatus 20 operates and the icy material in the hopper 100 is not at as high a level as opening 121 or 124 along a straight line therebetween.

Spout assembly 26 comprises a chute 128, a door member 130, extension arm 137, adjustment arm 139, a pin 138 to which plate 130 is pivotally attached, and a support arm 142 firmly fixed to the plate 40. The spout assembly 26 is, generally, firmly fixed to the intermediate plate 40.

The bottom of chute 128 is conical in shape; its sides are flat and vertical; it has an upper opening 126 the full front to rear length of the opening as 97, 98 or 99 in the plates 65. While it also has the full width of opening 97 (or 98 or 99) it may be somewhat narrower than the width or diameter of those holes but the length, i.e., the length measured in the plane shown in FIG. 6 is at least the diameter of the holes 97, 98 and 99 in plate 65.

Chute 128 encloses a spout chamber 148. Chamber 148 has a bottom opening 127, which is resiliently closed by a pivotal door member 130. The door member 130 is a watertight impervious U-sectioned closure having a bottom plate 129, a left vertical side 131, a right vertical side 132, a bottom edge 133, a top edge 134 and a downwardly extending lip 135. A resilient tension spring 145 attached to plate 129 and bottom of plate 40 urges door member 130 to close opening 127. Left side plate 131, and right side plate 132 loosely embrace the bottom edge of the chute 128 and the plate 129 firmly contacts the outlet orifice 127 of that chute when the apparatus is not operating. A bottom lip 135 of the plate 129 extends vertically downward at an angle to the flat portion 129 of that plate. The top edge 134 of the plate 129 extends above the top of the opening 127 of the chute 128 and the bottom edge of lip 135 of the plate 129 extends downward as far as the baffle plate 155 of the bag-opening assembly 28. On the right side and left side of the assembly 26 there are extension arms 137 and 137' firmly fixed to the bottom of the plate 129 and connected by right and left pins as 138 and 138' to rigid right and left adjustment arms 139 and 139' with bolts as 140 and 141 to firmly fix arm 139 to a rigid right support arm 142 (142' on left). Support arms 142 and 142' extend from and are rigidly attached to the plate 40. The pivot pins as 138 and 138' permit the door plate assembly 130 to pivot about the coaxial pins 138 and 138' and permit the opening of the plate 130 to open the orifice outlet 127 of the chute 128. A spring 145 is firmly attached to the plate 129 and to the intermediate plate 40; this is rather a light spring and generally keeps the plate 130 closed on orifice 127 although the discharge of ice through chute 128 causes the plate 129 to pivot clockwise (as seen in FIG. 6) and permit discharge of material through the chute 128 downward past the lip 135 into a bag 194 on the assembly 27.

The bag-opening assembly comprises an electric motor 151, a fan 152, a duct 153 and a guide duct 156. Motor 151 has a casing that is firmly supported on the frame assembly 23 of the apparatus 20 by transverse members as 58. The drive shaft of motor 151 is firmly and directly connected to a fan 152, the casing of the fan is supported on the casing of motor 151. The outlet of fan 152 is connected by a flexible duct 153 to a rigid duct 156 firmly attached to the bottom of chute 128 and formed by a vertical plate 155 in front, sidewalls of chute 128 and a rear duct wall 154, and top of forward end of duct 153. Plates 155 and 154 of duct 156 directs the flow of air from flexible air duct 153 down guide duct 156: duct 156 directs the flow of air obtained from the inlet 158 of the fan to pass downward into the bag top opening therebelow, 197B.

In operation the motor 151 operated by the switch 157 from the power source 200 drives the fan 152; the flexible duct 153 permits operative connection of the fan outlet to the duct 156 although the size of the sleeve units 61, 62 and 63 may vary and the distance of the plate 40 may accordingly vary to the fan. The air passing through the duct 156 passes downward (as shown in FIG. 6) through that duct past the lip 135 and serves to open each bag as 194 held by the assembly 27.

Figures 3, 4:
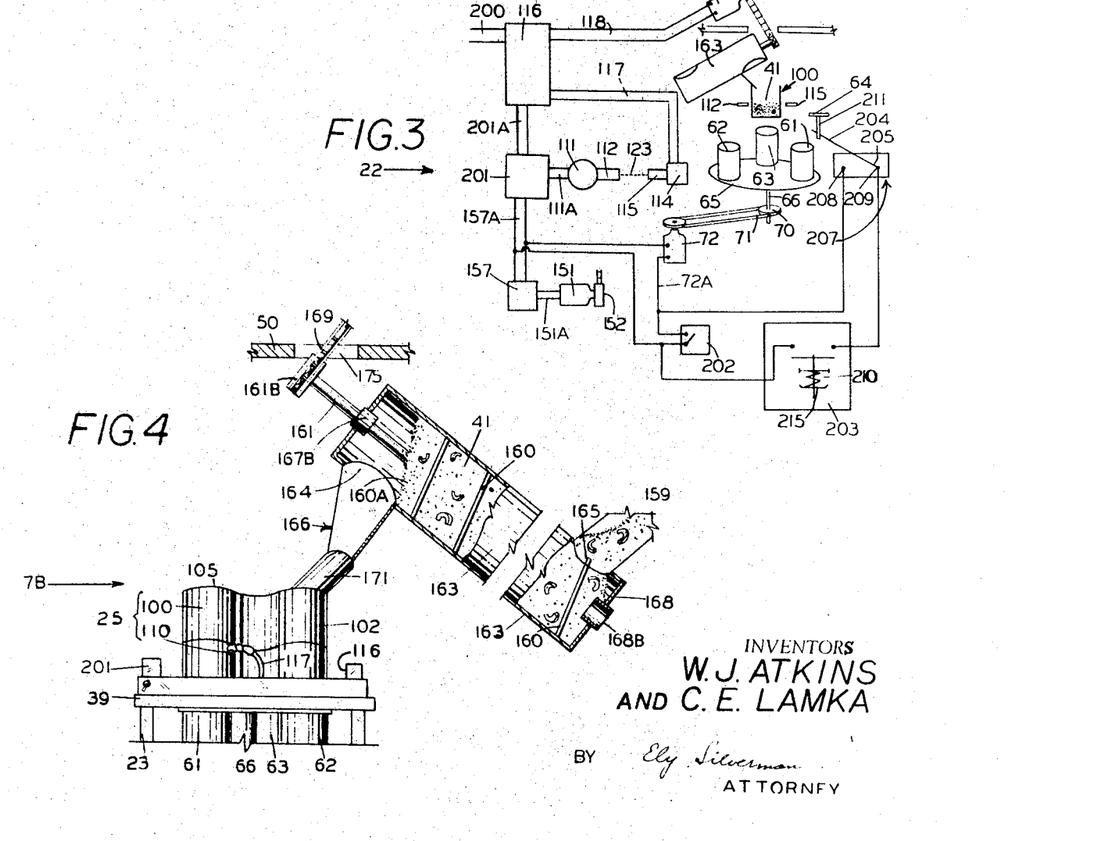
FIG. 3 is a schematic wiring diagram of the operative electrical connections of the components of the control assembly 29 of the apparatus 20.
FIG. 4 is a front view of the auger assembly and the hopper assembly shown in zone 4A of FIG. 2, the auger assembly shown broken away along vertical section 4A–4B of FIG. 7.

The auger assembly 21 comprises, in operative combination, an auger shaft 161, an auger blade 160, an auger motor 162, a gear box 170, an auger casing 163, a discharge chute 166. More particularly a uniformly helical auger blade 160 is firmly mounted on a rigid straight auger shaft 161; shaft 161 is driven by a chain 169 which is driven by a speed reducing gear box 170 on an auger motor 162 which box and motor are mounted in the ceiling 50 of the icehouse building; the chain 169 connects through an opening 175 in that ceiling to a toothed gear wheel 161B firmly fixed to shaft 161 beyond the casing 163. The casing 163 is an elongated hollow cylindrical container upwardly sloped, and as shown in FIGS. 2 and 4, to the left to above the upper most portion of the hopper assembly 25.

The casing 163 is made of rigid steel, preferably stainless steel, as is the auger blade. A discharge opening 164 is provided at the bottom of the chute casing 163 at its upper discharge end and an inlet opening 165 is provided at the top of the feed end of the auger assembly 21, near its lower feed end. A discharge chute 166 located above the hopper 100 extends downwardly at an angle of about 55° to horizontal from the opening 164 toward the opening 106 bounded by the upper edge 105 of the hopper 100. A supplemental guide chute 171 is attached to the hopper 100 and provides for more closely and particularly directing the discharge of ice from the auger assembly 21 into the hopper 100. The auger casing 163 is provided with a discharge end wall 167 and a feed end wall 168, each of these walls being firmly attached to the side of the chute in a watertight manner. A bearing 167B is located in the discharge end wall 167; feed end bearing 168B is located in feed end wall 168. The auger shaft 161 is rotatably yet firmly held in those bearings 167B and 168B to support the driven auger blade 160. Chute 166 is formed on a rear wall 176, a front wall 177, and a flat bottom wall 178 which are all imperforate and firmly joined together and have clear and smooth upper or inner surfaces. The edge 179 of the bottom wall 178 is located lower than the top of chute 171 where such a chute as 177 is used. If no such chute is used the bottom edge 179 is located above the top edge 105 of the hopper 100, within upward projection of outline of opening 106. The chute 171 forms a part of the assembly 21 and with chute 166 provides a particular direction to the mass of ice passing from assembly 21 to assembly 25.

In operation of the assembly 21 the motor 162, through gear reducer 170 and chain 169, drives the shaft 161 which turns the auger blade 160. The auger 160 on its clockwise rotation (as seen along the direction from plate 167 along shaft 161 towards plate 168) causes the masses of ice fed through opening 165 to move upward (and leftward as shown in FIG. 4) toward the discharge opening 164; the ice so moved passes therefrom through the discharge chute 166 to the guide chute 171 and thence into the hopper 100.

The bag-holding assembly 27 comprises a mounting plate 181, bracket adjustment guides as 186 and 187, a tilted wicket plate as 189 for support of bags as 194, 195 and 196. More particularly, a vertical rigid flat plate, mounting plate 181, is firmly affixed to rigid horizontal mounting plate top bracket 182 and a rigid mounting plate bottom bracket 183. Left bracket adjustment guides 186 and right bracket guide 187 are firmly affixed to the front of frame assembly 23 of the apparatus 20 and are each provided with a plurality of perforations as 186A and 187A for the seating therein of supports 184 and 185. Mounting plate bracket support plate 184 on the left and 185 on the right are firmly yet adjustably located in the perforations as 186A and 187A in bracket guides 186 and 187 respectively for vertical adjustment of the assembly 27 vertically up and down while maintaining the alinement of the bags as 194, 195 and 196 held by that assembly relative to the spout assembly 26.

Figure 5:
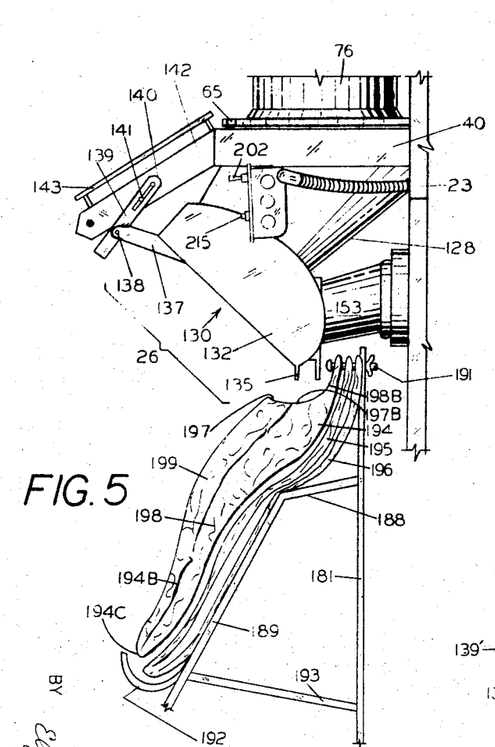
FIG. 5 is a view of the spout assembly 26 and bag holding assembly 27 as viewed in direction 5A of FIG. 2, assembly 28 operative.

A wicket plate 189 is a bent rigid plate one portion of which is held at an angle to the mounting plate 181 while also spaced some distance away therefrom (as shown in FIGS. 5 and 1). The upper portion of the wicket plate has a horizontal ledge 188. The right-hand portion (as seen in FIG. 5) of the ledge is firmly joined to the vertical mounting plate 181 and at the left end of that ledge, the angled portion 189 of the plate is firmly attached thereto. A bracket 193 is attached to the bottom portion of the angle portion 198 of the wicket plate and to the mounting plate 181, and firmly holds it in position. A curved rigid bottom lip 192 is firmly attached to the bottom of the plate 189 and extends (leftward as shown in FIG. 5 or) forward (as shown in FIG. 1) towards the operator of the machine. The pins 190 on the left and 191 on the right at the top of the plate 181 extend through holes provided therefor in the tops of the bags as 194, 195 and 196.

The bags as 194—196 lie on the ledge 188 at a rather small angle to the horizontal, thereby the air passing down from the assembly 28 through the space between the lower lip 135 and the bottom of the plate 154 strikes the front bag as 194 of the group of bags held to plate 181 at a point thereat which moves the forward lip as 197 of the bag 194 forward (leftward as shown in FIG. 5) and keeps that bag open for the entry of ice into the orifice created by the upper lip 197 of the bag 194 and, after removal of bag 194, corresponding lips of the other bags as 195 and 196 held on the assembly 27. The pins 190 and 191 pass through the holes at the top of each of the bags and firmly hold those bags to the plate 181. The rear ends of those pins (rightward as shown in FIG. 5) may be threaded and wing nuts there provided to hold the pins as 190 and 191 firmly in place during the operation of the machine.

In operation of the machine 20 after one bag as 194 is filled with ice the operator readily tears the bag away from the pins 190 and 191. The support provided by the pins as 190 and 191 for each of the bags as 194, 195 and 196 is quite adequate for transporting the empty bags from one position to another and locating the group of bags in an operative position on the machine 20 so that those bags may be filled with ice; however, the lower lip 192 of assembly 27, which is in contact with the bottom of the bags, provides for support of those bags when those bags are full of ice and prevents such bags from falling from the position in which they are held by the assembly 27 until the operator, by an additional increment of force, pulls one such bag from its location on the assembly 27 for manual transport to the assembly 29.

The control assembly 22 comprises the various switches (as 157, 202 and 203) controlled by the operator, the photoelectric eye assembly 110 controlled by the ice level in hopper 100 and motors attached to the relays and switches.

More particularly, the main electric power line 200 bringing electrical power at 110 volts a.c. in the particular embodiment 20 herein described passes and is operatively attached to the main relay 116 which is firmly attached to the frame 23 at a position whereat conduits therefrom as 118 may reach the motor 162 and also whereat it is easily accessible for installation and connection of the wire 200. The relay 116 is connected by wires 201A to a junction box 201 which is connected by conduit 111A to the photoelectric light source 111. The photoelectric light source 111 operates through the collimator 112 and the hole 121 in the hopper 100 to pass a light beam 123 horizontally through the space in the empty hopper 100 to the hole 124 in the opposite side of the hopper 100 and through the collimator 115 to the light sensitive relay 114. A conduit 117 is operatively connected to relay 114 and connects the relay 114 to the high power relay in box 116. This relay 116 operates to connect the line 118 to the power source line 200; the above-described passage light beam 123 causes relay 114 and 116 to then activate the motor 162 of the auger assembly and thereby turn the auger shaft 161 and the auger blade 160 within the auger casing 163 of the auger assembly 21.

The junction box 201 is also operatively connected by lines 157A to the motor switch 157 which is connected by a standard conduit 151A to the motor 151 which in turn activates the fan 152 of the bag-opening assembly 27.

Junction box 201 is also directed to a continuous action switch 202; that switch is firmly located, as shown in FIG. 5 in front of the apparatus near the spout assembly 26. The continuous action switch 202 is operatively connected by conduits 72A (shown in FIG. 3) to the motor 72 which at 6 r.p.m. drives the shaft 66, gear 72 is a gear motor with a built-in speed reducer. Gear 70 is chosen to drive shaft 66 at 5 r.p.m.

This action of the motor 72 turns the plate 65 and brings the units 61, 62 and 63 which are firmly attached thereto at a uniform speed to positions below the hopper 100 whereat ice as 41 may be deposited therein as desired and below described. A manual operation switch 203 is also connected in circuit with the electrical conduit lines leading from junction box 201 to the motor 72. This switch 203, as shown in FIG. 3, is in series connection with a sensor switch 207; switch 207 has contact points 208 and 209. A rigid sensor arm 204 extends beyond the casing of switch 207 to contact the control points such as points 211 and 212 next to units 61 and 62 (and corresponding control points 213 for unit 63) and firmly attached to the upper plate 64. The movement of these points past the sensor arm 204 serve to lift the switch arm 205 and break contact in the circuit of point 208 to switch arm 205 to point 209 of switch 207 and, accordingly, disconnects the motor 72 from its operative connection to its power source each time one of the units (as 61) is over the center of chamber 148 of the spout assembly 26. Accordingly, at that point the operator ceases to urge closed the button 215 of the normally open switch 203 (as the spring 210 opens that circuit) and keeps the motor 72 disconnected until the next time the operator pushes the button 215 to again start the operation of the motor 72.

During this operation the light beam 123, operating on the relay 114, keeps the motor 162 turning so long as the light beam is not interrupted by the accumulation of ice to a level between holes 121 and 124 in the hopper 100 higher than those holes; when the light beam is cut off the motor 162 will stop its operation and no more ice will be fed from assembly 21 into the hopper 100 until the level of ice in the hopper 100 again falls below the level of light beam 123.

Whether or not the ice is being added by the auger assembly 21 the motor 72 maintains the rotation of the assembly 24 at a uniform velocity of 5 r.p.m. On distribution of ice from hopper 100 into the spout assembly 26 and from the spout assembly (with the operation of the bag-opening assembly 28 maintaining the bags as 194 on the bag-holding assembly 27) the bags are filled with ice in an accurate manner as below described and the filled bags are transferred by the operator 48 from their position on the wicket plate 181 to the bag-sealing assembly 29.

Figure 8:
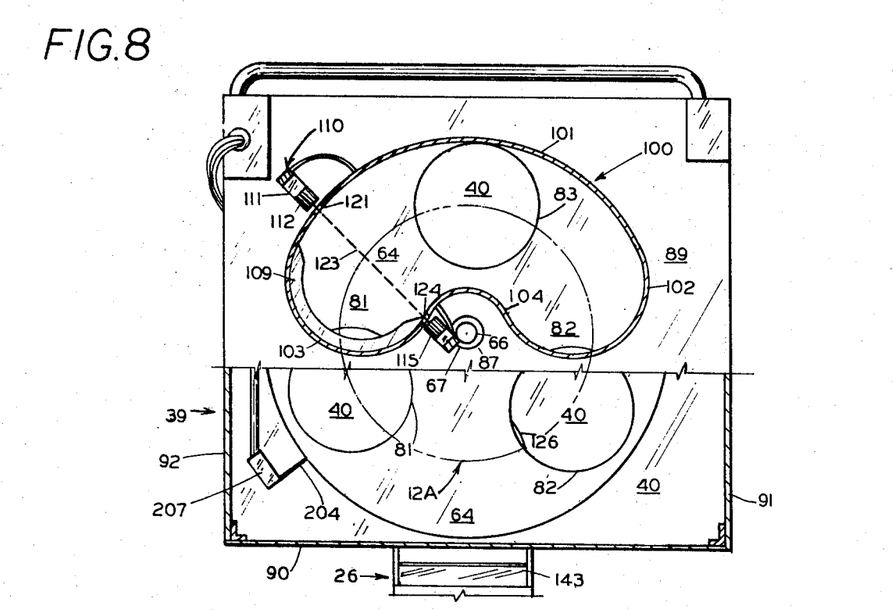
FIGS. 8, 9, 10 and 11 are a sequence of composite horizontal sectional and broken away views each of which is taken along the horizontal planes 8B–8C and 8D–8E of FIG. 7, plane 8B–8C being spaced apart vertically from the plane 8C–8D; these composite transverse horizontal cross-sectional views are to show the relations of the holes at the top of the sleeve assemblies 61, 62, 64 during the operation of the apparatus 20 to opening 126 in plate 40 and to ends and walls of the hopper 100.
Figure 9:
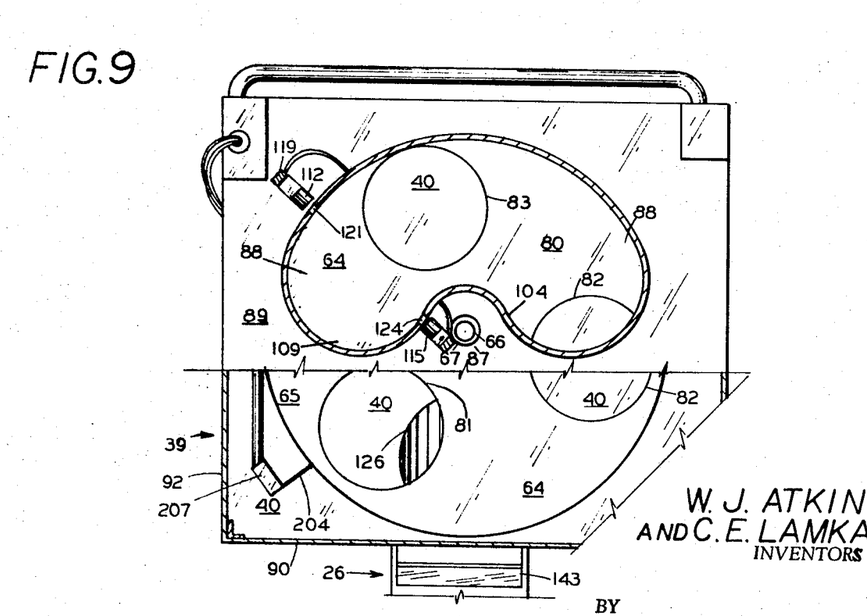

In the cycle of operation of the apparatus 20 the units 61, 62 and 63 rotate in series past the orifice or opening 88 at the bottom of the hopper 100, at a steady rate of speed. The openings 81, 82 and 83, of the units 61, 62 and 63 respectively are then accordingly open upwardly to the hopper 100 as shown in FIGS. 8 through 11. At one stage of the cycle of operation shown in FIGS. 8 and 12, unit 63 is directly below the center of the hopper 100. In this position the opening 126 in plate 40 does not communicate with the hopper 100 at all through the unit 61 and the small portion of the opening 82 then located at the bottom of the hopper 100 through the unit 62 is too small for the particles of ice fed into the apparatus 20 to pass through and even if such were possible the opening 97 from the bottom of unit 62 to the opening 126 would be too small for the particles to be put into the hopper 100 to pass therethrough. Accordingly at this point (shown in FIGS. 8 and 12) the hopper 100 is effectively, for such size of particular material, entirely cut off from communication with the chamber 148 of the spout assembly. At the same point in time of operation of apparatus 20 (as shown in FIG. 8) the unit 61 does not communicate at all with the opening 126 although it does in a stage of operation shortly subsequent thereto as shown in FIG. 9.

It is the position of units 61, 62 and 63 relative to hopper 100 shown in FIG. 9, which position is subsequent to the relationship of the parts shown in FIG. 8, the unit 62 has moved counterclockwise and more of the opening 82 is open to and located below and within the interior outline of chamber 100. In is at this point in operation shown in FIG. 9, that the ice which is added to and located in the hopper 100 usually begins to fill the sleeve unit of assembly 24 located as shown for 62 in FIG. 9. Also at the position shown in FIG. 9 unit 61 is in communication with the opening 126; when the chamber of unit 61 has been previously filled in hopper 100 at least a part of the ice from unit 61 usually begins or has begun its downward vertical movement at this position.

Figure 10:
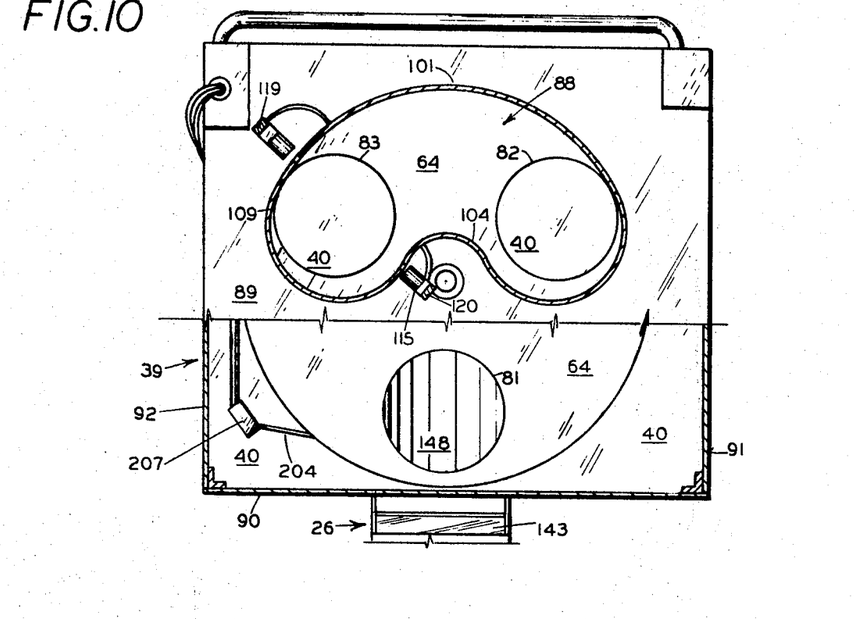

FIG. 10 shows a stage in the operation of the apparatus 20 wherein the units 62 and 63 (of which only the holes 82 and 83 are visible) have been moved (by motor 72) further counterclockwise than the position therefor shown in FIG. 9. In this position both sleeves 62 and 63 are completely open to the hopper 100 and closed at their bottom by the top of surface 40. At this point whatever ice had been previously added to chamber 100 usually has filled the chamber 62. Also, the top of chamber 61 (of which the entrance opening 83 is shown in FIG. 8) is "stuck" i.e., the material at the top of the chamber is first contacted, by the bottom edge 214 of the left end wall 103. At this position also the chamber 61 is vertically over the chamber 148 of the spout assembly 26 and has completely emptied its contents thereinto. The walls of the unit 61 are all vertical; accordingly there is no "hang-up" or adherence of the ice on the sidewalls and there is a complete emptying of each unit as 61 into chamber 148.

Figure 11:
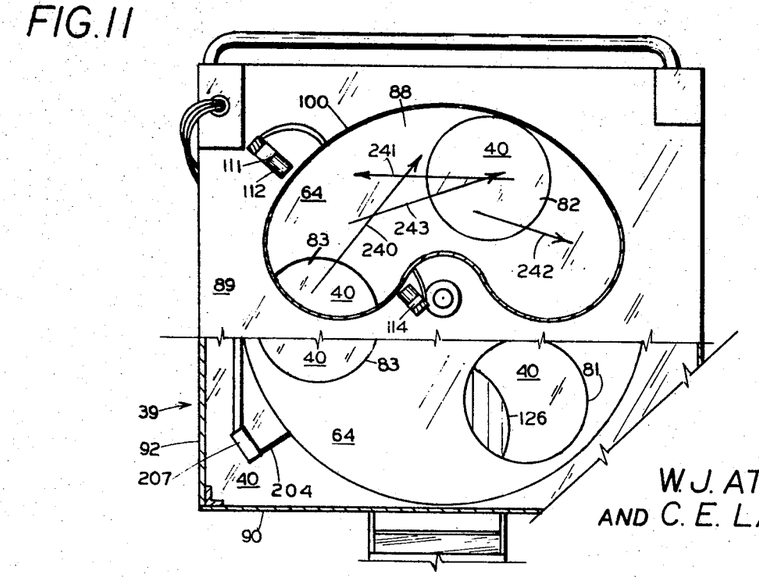

FIG. 11 shows the stage of operation of apparatus 20 whereat the unit 61 is beginning to lose communication with the hole 126 and with chamber 148. Opening 82 of unit 62 is in this stage of the process then advanced further counterclockwise than it had been in the position thereof shown in FIG. 10, and, in the normal process of operation of the apparatus in major portion, unit 62 is filled with ice. The unit 62 then advances to the positions shown for unit 63 in FIG. 8, then to the position shown for unit 63 in FIG. 9, then to position shown for unit 63 in FIG. 10 and then to the position shown for unit 63 in FIG. 11. In this same position shown in FIG. 11 the opening 83 of unit 63 to hopper 100 is reduced in size from that shown in FIG. 10 and the bottom opening 97 of that sleeve is still closed by the top of plate 40 from opening 126 of the chamber 148 of the spout assembly 26.

The immediately subsequent position of unit 63 during operation of apparatus 20 corresponds to the position of unit 61 shown in FIG. 8 (by position of its opening 81) followed by the position shown in FIGS. 9, 10 and then 11 during which later stages of that operation (shown by FIGS. 9, 10 and 11) the ice put into the unit 63 as above-described is discharged into the spout assembly 26. The same sequence of operations which is above-described in detail for unit 62 in assembly 24 occurs in sequence for all of the like units 61, 62 and 63.

The process of operation of the apparatus 20 is related to the position of the ice in hopper 100. Some aspects of this relationship are diagrammatically illustrated in FIG. 12: these relations are set forth in the following description of operation.

A mass of freshly made ice in a storage area 159, helped with such agitation by an operator using a ½-inch diameter steel rod as is necessary, enters as clumps varying in size from single arcs to 10-inch diameter masses into the 12-inch diameter inlet opening 165 of the case 163 of the auger assembly 21. The helical auger blade 160 actuated by motor 162 drives the mass of ice arcs 41 upwards through the casing 163 to the discharge opening 164. As above-described the actuation of the auger blade 160 is dependent on the actions of the photoelectric eye assembly of the control assembly 22.

This movement of the ice from opening 165 to opening 164 by the action of the helical auger blade causes a slight compression of the ice arcs. The angle of repose of the mass of ice arcs at the top of the auger blade, as shown at position 160A in FIG. 4, is usually in excess of 60° and frequently as high as 85°. Such angle of repose shows that the units of the mass of ice arcs at this point have been formed into a nonfluent mass. On actuation of the auger blade 160 the mass of ice units leftward of the auger face closest to opening 164 drops from bottom lip of the chute 166 for about a total of 2 feet to the top surface 80 of plate 64.

Figure 12:
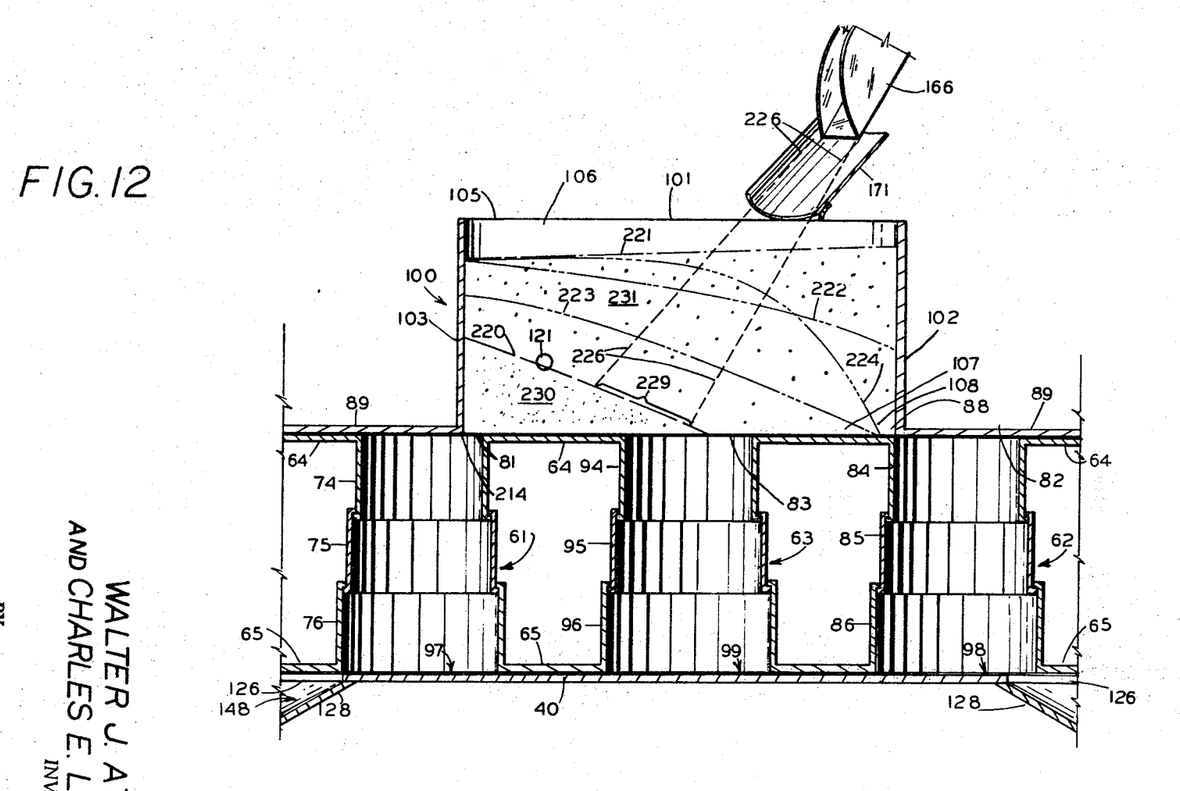
FIG. 12 is a diagrammatic expanded longitudinal cross section along the vertical right cylindrical surface shown as 12A in FIG. 8 to show some of the spatial and time relations of the materials and components of apparatus in hopper assembly 25 during operation of the apparatus 20, the units 61, 62, and 63 shown empty to illustrate details of structure.

The particles in the mass of ice 160A fall relatively freely as a stream of clumps of units down chutes 166 and 171 to the interior of chamber 100. That stream of ice clumps and units meets the top surface 220 of ice arc units in the hopper 100 in an initial area or zone of impact 229. At such initial zone as area 229 whereat it first meets the mass of ice in the hopper whatever conglomerates of ice had been formed in and did exist at zone 160A of FIG. 4 are then broken up and also the mass of ice units below area 229 in the chamber hopper as 100 is churned and admixed with the stream and becomes a mass of freely movable discrete ice arc unit particles that flows readily, as shown by discussion of surfaces 224 and 223 herebelow. This addition of the ice to hopper 100 causes the level of the ice in the chamber of hopper 100 to increase to the surface level (shown as line) 222 from the surface (shown as line) 220 and the area of impact of the stream changes with the change in upper level of the volume in hopper 100. The volume within the hopper 100 is about four times the volume of any one sleeve or volumetric unit as 61, 62 or 63. The total volume and level of the mass of ice changes in the hopper 100 as the ice is added thereto from the auger assembly 21 and as concurrently ice is removed from the hopper 100 by the passage of units 61, 62 and 63 past opening 88 and the discharge of ice from hopper 100 into those units and from those units, 61, 62 and 63 into the chamber 148. Nevertheless, and more particularly, in the operation of the apparatus 20 the level of the ice varies from a lower surface level (shown by broken line 220 in FIG. 12) to an upper relatively horizontal surface level 221 (shown by dash and dot line). The lower surface 220, (shown by a line composed only of dashes) runs steeply to the right and downward while passing through and generally parallel to the line of light beam 123. Upper surface 223 is, relatively horizontal but slightly sloped, extending from edge 103 to the right and somewhat upward as shown in FIG. 12. The surface 220 is relatively flat (considering it is made up of the upper surfaces of ice arc units) and, as can be judged by naked eye at a distance of 2 feet, a substantially uniformly sloped surface of about 25°-angle to the horizontal and passes slightly below the bottom of the holes 121 and 124 of the photoelectric system 110. This surface 220 defines, with surface 80, the angle of repose at the time at which the minimum amount of ice arcs provided by the control system 22 is in the hopper 100. (FIG. 12 is an expansion and not to scale in regard to this surface). The usual minimum amount of ice arcs (or other like units, such as cubes, or ice fragments) in hopper 100 is located between hopper end 103, surface 220 and surface 80, and is herein below referred to as zone 230. The right-hand bottom end of surface (shown as line) 220 covers the top opening of the unit 63 in the position of apparatus shown in FIG. 10. In the process of operation of the apparatus 20 when the level of the ice falls to a point below the light beam 123 the photoelectric eye system 110 activates the relay 114 which activates relay 116, which activates the motor 162 which drives the auger 160 to add more ice to the hopper 100. The chute 166 is arranged, as shown in FIGS. 2, 4, 7 and 12 to discharge the ice arcs from the auger casing 163 to a zone located slightly to the left, i.e., counterclockwise, of the left edge of the orifice 83 in FIG. 8, more particularly, to the zone outlined by the orifice 83 in FIG. 9.

The volume of the auger and the size and speed of the motor 162 and its speed reducer are so chosen that the hopper 100 and one empty chamber connected thereto, as 63 in FIGS. 8 and 12 is filled 3 seconds after the light beam 123 extends from hole 120 to hole 124 in hopper 100: this filling is up to the level of a top surface (shown by line) 221. This filling is accomplished by a total of six to eight, usually seven rotations of the shaft 161. There is a slight time lag in the operation of the relay to motor 162 and once that motor has been started it produces an excess of addition to the hopper over that required to only change the level of the ice from a level as plane 220 which passes immediately below beam 123 to a level only very slightly thereabove. To the contrary the level of the ice in hopper 100 after completion of activation of the auger assembly 21 by the control assembly 22 reaches a level as shown at 221. The highest point of level 221 is from 1 to 2 inches below the top edge 105 of hopper 100.

The initial path of the ice with the auger turning at its full speed throws the ice farther to the left or discharge end 103 of hopper 100 than that auger does when the motor is slowing down. When the motor slows down the ice merely drops vertically from the chute 166 and loads up at the right-hand (feed end) side of the hopper 100 and develops accordingly, a slight slope downward from the right to the left for the relatively level surface 222. Surface 222 is about 1½ (± ½) inch higher at right end 102 of hopper 100 than it is at left end 103 of that hopper. When the level of the ice in the hopper 100 is at surface 221 and the rotating sleeve assembly 24 operates as above-described the angle of repose of the contents of hopper 100 changes. The upper surface level briefly changes to the curve shown as 224 as unit 62 is filled when a unit as 62 enters the position shown therefor in FIG. 9 from the position thereof shown for FIG. 8. The surface level of the ice arcs in hopper 100 as the unit 62 then moves to the position shown in FIG. 10 from that shown in FIG. 9, changes to the rather evenly sloped surface 222, sloped more than surface 221. At the position of the unit 62 shown in FIG. 10 and usually no later than FIG. 11 each sleeve unit as 62 is substantially completely filled with ice. As the next unit 61 comes into operative connection with the opening 88 below hopper 100 as shown by sequence of FIG. 11 (for unit 61, indicated by its opening 81 and then substituting unit 62 for unit 61, indicated by its opening 82 shown in FIGS. 8 and 9) FIG. 8 and FIG. 9, the level of the top surface of the ice falls from the position shown by 222 to that of surface (shown by line) 223, surface 223 has a larger angle with the horizontal than does the surface 222 representative of the angle of repose of the mass discharged immediately therefore to the proceeding unit 62. The surfaces represented by lines 220, 222 and 223 slope in slightly different directions as shown by direction of arrows 240, 242 and 243 respectively, in FIG. 11, those arrows lying in the surfaces shown by lines 220, 222 and 223 respectively.

When the level of the ice comes to the position shown by the surface (indicated by line) 220 additional ice arcs are added, as above-described, from unit 21. Such additional units of ice arcs comes down a path as 226 and strike the mass of ice then (hereinafter referred to as initially) in zone 230, on surface 220 at an area of impact shown as 229 and agitates and mixes with and displaces the ice initially in zone 230; the resultant mixture is agitated by and admixed with and displaced by continued further increments of additional ice arcs in the continued stream thereof from unit 21. Thereby the units of ice arcs (or the like that is in hopper 100) initially at zone 230 are agitated, loosened, displaced and moved to a zone 231, upward and to the right of zone 230 as shown in FIG. 12. Subsequent to the addition of that ice bringing the level thereof to the surface 221 the mass of ice at 231 (initially at 230) is discharged into one of the units as 61, 62 and 63 when the level of the ice in hopper 100 (subsequently) falls to a surface level as 223 or 224 from surface level 221. The slope of the line 221 is only about 0° to 3° to the horizontal and shows the angle of repose of that then relatively fluid mass, this mass being fluid and having a very low angle of repose because this mass has just been (within the past 3 to 6 seconds) given a very severe shaking up by the stream of ice arcs added thereto from the chute and traveling along a path as 226; Portions of that same mass of ice arcs shortly develop a higher angle of repose as indicated by surfaces (shown as lines) 223 and 220 because of the "packing" or matting or cohesive nature of ice, although it doesn't reach an angle as high as at 160A. The brief development of the curved surface 224 and its change to the evenly and slightly sloped surface 222 shows the fluidity of the mass in hopper 100 very shortly (5—15 seconds) after the addition of the ice arcs to the hopper 100. The time-and-space relationships of the speed of the unit 63 toward the wall 103 additional to those above set out and in table I are that the assembly 24 rotates at 5 r.p.m. about its axis, the center of vertical shaft 66. The distance from edge 103 to edge 102 is 19 inches. The internal diameter of holes 81, 82, 83 are each 7 inches and the distance vertically (as shown in FIG. 8) from interior of wall 104 to interior of wall 101 is only slightly greater 7⅓ inch. The outer edge of each opening, 81, 82, 83 is tangent to wall 101: this provides a vertical drop from the vertical walls of hopper 100 into each of units 61, 62 and 63 as they initially traverse the opening 88 and, a smooth nonjarring flow of the units at the upper surfaces of the mass of ice arcs (or the like used in hopper 100) in the neighborhood of the sloped surfaces as 223 and 220 from the hopper into the units as 61, 62 and 63, with no accumulation or hindrance to such smooth flow at the junction of surface 80 lateral to the holes as 81, 82 and 83. This avoids any accumulation of ice in the chamber 100 that might interfere with the operation of the photoelectric system 110, by providing along wall 100 at all times a complete elimination of ice from the chamber to the right of any point intersected by the upper surface as 220 and 223 of the ice arcs in the chamber 100. This elimination of such potential accumulation provides for a reliably reproducible slope of ice of the same physical condition and fluidity in hopper 100. This permits that the sensing system, of which beam 123 is a part, will come into action rapidly and reliably.

These time and structure relations provide that when the level of the arc ice mass in hopper 100 drops below the straight line between holes 121 and 124 there will be an addition of ice which, within 3 seconds of the moment of start of each such addition adds to the hopper 100 a volume of ice arcs sufficient to fill four units as 61, 62 or 63. Hopper 100 has a capacity of five times the volume of each such unit; this leaves a continual reserve at zone 230 as above-described of one unit; this process provided for filling the hopper 100 in periodic increments large enough to effect thorough agitation, mixing and displacement of the high angle of repose residue material in the hopper. This process and apparatus provides sufficient frequency of addition of increments to avoid any substantial change in bulk density of the material fed to the volumetric measuring units 61, 62 and 63, because the length of time the arc ice material is permitted to stay in the hopper 100 is small enough that its contents, (with the agitation and displacements by discharge from chute 166 in the cycle of operation of apparatus 20) will be discharged into the volumetric measuring units before the "packing" characteristics change. Nevertheless, the hopper capacity and use thereof are large enough to be independent of variation in operating characteristics and delays of the control assembly 22 and auger assembly 21 in view of the volumetric capacity of the units 61, 62, 63.

This structure and process uses the energy of the moving ice to disrupt the development of compaction in the ice and avoids providing any surface on which the ice could adhere or "hang-up." Stirring of the ice is provided by the added ice to the mass of ice which most needs it, namely the portion which has been urged toward the lower left-hand corner of the hopper 100 as shown in FIGS. 8 and 12. Further, sensing of the level in hopper 100 is accomplished without the projection of any solid member into the chamber on which a permanent attachment of ice might develop. The sharp corner provided, corner edge 214, cracks such portions of the relatively brittle ice arcs as do not readily fit into the chamber of the unit as 61. The fluid nature of the material above surface 80 in hopper 100 permits ready movement thereinto of any particle separated out from a unit as 61, 62, 63, by the edge 214. This provides a uniform volumetric feed to these chambers as 61, 62 and 63 inasmuch as all units have the same diameter and same length from the bottom of the plate 89 to the top of plate 40; each such volume is completely discharged from each of the chambers 61, 62 and 63 to the chamber 148 thence to the bags as 194, 195 and 196.

With only occasional help from the operator or his assistant to rod the mass 159, the machine 20 continuously and accurately fills a 10-pound bag as 194 every 12 seconds; the filled bag is put on an automatic sealing assembly 29 whereat the open lip 147 of each bag as 194 is firmly sealed to a back portion thereof as 198.

In the above-described operation of the machine for 10-pound bags of arc ice, the apparatus 20 fills each such bag within 1 ounce of accuracy during all of an 8-hour shift. The height of units 61, 62, 63 may be varied by locating plate 40 in the series of holes as 43 and 44 at such a height on members 31, 32, 33, 34 as is desired to obtain the desired height of units 61, 62 and 63, and as members 94, 95 and 96 are readily telescoped to such volume as is desired. The speed of the operation may be varied by changing the ratio of diameters (and sprocket teeth) of sprocket wheels 70 and 73 to provide 4 to 6 r.p.m. as desired to assembly 24. For 20-pound bags the operator empties two units as 61, each holding 10 pounds of ice, (arc or cube or the like) into each 20-pound bag held by assembly 27.

A transparent window 143 on assembly 26 permits the operator to view the discharge of fluent icy material through opening 127 and determine if there are any clumps formed in chamber 148. The spring 145 is provided with only sufficient tension to readily open when ice is discharged through chamber 148 and permits said ice to pass into the opening formed at lip as 197 of each bag, as 194 by the bag opening assembly 28. The opening 197B is located below the lip 135 and plate 154 and out of physical contact therewith. The blast of air from assembly 28 provides an adequate forward extension of lip 197, as shown in FIGS. 1 and 5, for reception of the entire discharge of chamber 148 and units 61, 62 or 63.

The position of chute 166 and 171 in FIG. 12 to the left of portion 102 of the hopper wall first passed by each unit illustrates that the icy material that enters into the initial portion of the opening of the unit (as 62 in FIGS. 8 and 12) which first receives the contents of hopper 100 is the fluent material to the right of area of impact 229 as shown in FIG. 12.

The bags as 194, 195, 196 used to receive the arcs are each composed of a flat flexible back panel as 198 and a flat flexible front panel as 199 for bag 194. Panels 198 and 199 are rectangular in shape and of the same width. Panels 198 and 199 are joined at their left, right, and bottom edges 194A, 194B and 194C respectively, and the top lip 197 of panel 199 is free. An upper portion, 197 of panel 199 is free and forms a front straight edge or lip of an opening 197B into the chamber formed of panels 198 and 199. The upper portion 198B of panel 198 extends above the lip 197 and is held by pins as 191 and 190 to the bag-holding assembly 27. Potential opening 197B is normally located below lip 135 of assembly 28, and stays flat, as shown in FIG. 6, until opened by the operation of assembly 28, as shown in FIG. 5.

The bag opening 28 serves to keep the frontmost bag, as 194 of the group of bags, as 194—197 on assembly 27 open prior to initial opening of the spout door assembly 130. The flexible duct 153 accommodates to changes in height of plate 40 for desired changes in size and capacity of units 61, 62 and 63.

As shown in FIG. 8, the cylindrical surface 12A intersects vertical end walls 102 and 103 in straight lines that are on opposite sides of the vertical axis of shaft 66; this axis is also the center of curvature of the cylindrical walls 101 and 104. This lengthy and curved relationship helps provide fluent particulate feed to the units as 61, 62, 63 as they first open to the chamber formed between walls of hopper 100. According to the process above-described the icy material 41 is usually added to the container 100 from chute 166 in 2 to 4 second periods that are usually spaced 12 to 15 seconds apart. With larger and smaller volumes of unit as 61, at the same 5 r.p.m., the period between such loadings will, respectively, vary from 10 to 30 seconds. With 4 to 6 r.p.m. speed of assembly 24 there are 12 to 18 discharges of units as 61 per minute.

TABLE I

Frame Assembly 23:
    Width (31–32)—27½".
    Height:
        (39–49)—67½".
        (39–105)—79".
    Depth (31–33)—17½".

Assembly 24, cylinder 51:
    Height (40–89)—14".
    Diameter (top) (83)—7".
    Distance to center of shaft 66 from center of hole 83—7".

Material—18-8 restaurant stainless steel for all ice contacting or bearing surfaces, e.g. hopper 100, surfaces 40, 89 interior of units 61, 62, 63, 148.

Motor 72—Totally enclosed fan cooled gearmotor 1/20 H.P.; 150 in lbs. full load torque 1 continuous, (model 3M127 W.W. Graininger); 12 r.p.m. full speed; choice of gears 73 and 70 provides desired r.p.m. of assembly 24.

Auger 21:
    Diameter—10".
    Length—10'.
    Pitch of auger—6".
    Shaft 161 angle to vertical—65°.
    Drop from opening 164 to surface 80—24".

Bag 194, thickness—2½ mill polyethylene.

Apparatus 20, capacity—1,000–10 lb. bags per hour.

TABLE I—Continued

Hopper 100:
  Height (65–105)—15″.
  Width (101–104)—7⅞″.
  Length (maximum) (102–103) (in FIG. 8)—19″.
  Hole 21 diameter—⅛″.[1]
  Height over 80—4½″.
  Distance from end 103 (as per FIG. 12) [2]—5½″.

Unit 110, Autotronic model A 579 C—Daniell, Illinois.

Unit 29, Bag sealer model BD–2 of Doughboy Industries, New Richmond, Wisconsin Serial No. 66–167.

Plate 181:
  Height—29″.
  Width—14″.

---

[1] Size chosen to be too small to permit egrees of the units of ice arcs therethrough. A transparent window could be used to fill up the hole.
[2] Provides that even a 45° angle of repose covers the left most 7 inches in hopper 100.

We claim:

1. Process for accurate continuous and automatic volumetric dispensing and bagging of icy particulate material comprising steps of:

a. locating a first portion of said icy particulate material in a first large container having a lower opening, moving each of a series of smaller separate volumetric receptacles each having an upper opening and of like volume therebelow into and out of operative connection with said lower opening, said icy material then flowing from said first container into each of said series of smaller receptacles in operative connection therewith while the top level of said first portion of icy material moves downward and the angle of repose of the portion of said icy particulate material remaining in said first container increases;

b. repetitively sensing the top level of said remainder of said first portion of said icy material in said first container and, intermittently, when said top level of said first portion falls to below a predetermined height, forcefully adding an initial portion of a continuous stream of nonfluent clumps of additional icy material of the same composition as in said first portion to the top surface of the portion of said icy particulate material remaining in said first container, said stream agitating, mixing with and displacing all of said first portion of icy particulate material remaining in said first container with the said initial portion of said added stream of icy material and forming a resultant mixture and the resultant mixture is agitated only by and admixed with and displaced by said initial portion and further increments of icy material of said stream, thereby forming in said first container a fluent mass of icy material having an angle of repose lower than that of said remaining portion to which said stream is added and lower than that of the icy material from which said stream was formed, said stream having in total a volume larger than the volume of each of said series of separate volumetric receptacles and smaller than the volume of said first container and wherein the said agitating of the first portion with said additional icy material and said mixing of said first icy portion with said additional icy portion and agitating therewith avoids any substantial change in the bulk density of the material fed to said series of volumetric receptacles, said stream of additional material being supplied to said first container at sufficiently short intervals of time to maintain the icy particulate material within said first container in a substantially fluid condition; and c. continuously feeding said resultant fluent mass of icy particulate material from said first container into each of a series of smaller separate receptacles of like volume therebelow moved into operative connection therewith while the top level of the fluent mass of icy particulate material in said first container falls and the angle of repose of that fluent mass increases, striking of the excess of the fluent mass of icy particulate material fed into each of such receptacles and leaving a residue of said icy particulate material in said first container and moving each of said thus fed receptacles out of operative connection with said first container and thereafter operatively connecting each of said thus fed receptacles with one of a series of second separate containers for icy material and then completely discharging each of said thus fed receptacles into said one of said series of second containers therefor and thereafter removing the said one of said second series of containers and the icy material therein from operative connection with said receptacle.

2. Process as in claim 1 wherein said icy material is formed from discrete particles of icy material.

3. Process as in claim 1 wherein said sensing is continuous and wherein at least one of said series of volumetric receptacles is continually brought into operative connection with said first container, and wherein said fluent mass is fed continuously into at least one of said volumetric receptacles.

4. Process as in claim 3 wherein the resultant fluent mass of icy material has an angle of repose of 0° to 3° and wherein the angle of repose of said additional icy material is in excess of 60°.

5. Process as in claim 3 wherein the first container is filled and the contents of said container agitated and made fluent by said stream within one-fourth of the period of time between initiation of discharge of each of said series of second receptacles into one of said series of second containers.